(12) United States Patent
Richards, III et al.

(10) Patent No.: US 9,207,739 B2
(45) Date of Patent: Dec. 8, 2015

(54) DYNAMIC POWER SYSTEM ADJUSTMENT TO STORE ENERGY FOR POWER EXCURSIONS

(71) Applicant: Dell Products L.P., Round Rock, TX (US)

(72) Inventors: George G. Richards, III, Round Rock, TX (US); Mark Muccini, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 291 days.

(21) Appl. No.: 13/633,700

(22) Filed: Oct. 2, 2012

(65) Prior Publication Data

US 2014/0095917 A1 Apr. 3, 2014

(51) Int. Cl.
*G06F 1/32* (2006.01)
*G06F 1/28* (2006.01)

(52) U.S. Cl.
CPC ............... *G06F 1/3203* (2013.01); *G06F 1/28* (2013.01); *G06F 1/3206* (2013.01)

(58) Field of Classification Search
CPC ............... G06F 1/32; G06F 1/26; G06F 1/28
USPC ......... 713/300, 310, 320, 321, 322, 323, 324, 713/330, 340, 375; 700/295; 361/87
See application file for complete search history.

(56) References Cited

U.S. PATENT DOCUMENTS

| | | | | |
|---|---|---|---|---|
| 5,627,412 | A * | 5/1997 | Beard | 307/82 |
| 6,153,949 | A * | 11/2000 | Soderhall | 307/125 |
| 6,370,046 | B1 * | 4/2002 | Nebrigic et al. | 363/60 |
| 8,774,976 | B2 * | 7/2014 | Mansfield | 700/291 |
| 2004/0061474 | A1 * | 4/2004 | Ozeki | 320/101 |
| 2004/0253489 | A1 * | 12/2004 | Horgan et al. | 429/13 |
| 2009/0300391 | A1 * | 12/2009 | Jessup et al. | 713/323 |
| 2011/0010567 | A1 * | 1/2011 | Schmitz et al. | 713/300 |
| 2011/0162861 | A1 * | 7/2011 | Borinato et al. | 173/176 |
| 2012/0035780 | A1 * | 2/2012 | Chen | 700/298 |
| 2013/0062942 | A1 * | 3/2013 | Hantschel | 307/19 |
| 2013/0184914 | A1 * | 7/2013 | Sujan et al. | 701/22 |

FOREIGN PATENT DOCUMENTS

WO WO2012/012482 * 1/2012 ............... B60K 6/28

* cited by examiner

*Primary Examiner* — Jaweed A Abbaszadeh
*Assistant Examiner* — Keshab Pandey
(74) *Attorney, Agent, or Firm* — Haynes and Boone, LLP (57) ABSTRACT

A power system is coupled to a powered system and a system capacitance. The power system includes a power system output sensor, a power conversion device, and a power system output controller. The power system output controller includes a powered system threshold that is related to a power excursion capability of the powered system. The power system output controller is operable, in response to receiving a power system output signal from the power system output sensor that exceeds the powered system threshold, to control the power conversion device to increase the power system output from the power conversion device in order to increase the energy stored in the system capacitance for use by the powered system during a power excursion. The powered system may include processors that draw power from the system capacitance during power excursions so as to not exceed the limits of the power system.

20 Claims, 4 Drawing Sheets

DYNAMIC POWER SYSTEM ADJUSTMENT TO STORE ENERGY FOR POWER EXCURSIONS

BACKGROUND

The present disclosure relates generally to information handling systems (IHSs), and more particularly to dynamically adjusting an IHS power system to store energy for power excursions by an IHS.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

As IHS performance continues to increase, IHS power demands are increasing to support this increased performance, and are resulting in increased IHS power excursions that may provide relatively short but high peak power demands on the power system. Conventionally, power excursions such as, for example, dynamic power ($Pd_yn$) and maximum power (Pmax) excursions of an IHS processor, drive the sizing of the power system components. For example, a load integrated circuit (IC) die may be powered by a voltage regulator that draws its power from a voltage power plane distributed on a motherboard, and that voltage plane is powered from a power supply unit (PSU) in the power system. When IC die power excursions are relatively low, the voltage regulator can generally handle those power excursions without that power demand being "seen" at the PSU (i.e., they do not increase the output current demand from the PSU.) However, when the IC die power excursions become relatively high, they begin to be seen by the PSU (i.e., they increase the output current demand from the PSU), and if those power excursions become high enough, a protection circuit in the PSU may be asserted that will cause the PSU to shutdown, which may result in data loss. This can occur due to peak power excursions even when the average power drawn by the IHS is well below a PSU shutdown threshold. Conventional solutions to this issue are to provide a power system that is sized for any possible IHS peak power excursions, which result in costly, oversized, and inefficient power systems that have power output capabilities that are not needed for the vast majority of system operation, which occurs at power levels well below those IHS peak power excursion power levels.

Accordingly, it would be desirable to provide an improved IHS power system.

SUMMARY

According to one embodiment, a power system includes a power system connector that is operable to couple to a powered system and a system capacitance; a power system output sensor coupled to the power system connector; a power conversion device coupled to the power system connector and operable to provide a power system output to the system capacitance and the powered system; and a power system output controller coupled to the power conversion device and the power system output sensor, wherein the power system output controller includes a powered system threshold that is related to a power excursion capability of the powered system, and wherein the power system output controller is operable, in response to receiving a power system output signal from the power system output sensor that exceeds the powered system threshold, to control the power conversion device to increase the power system output from the power conversion device in order to increase the energy stored in the system capacitance for use by the powered system during a power excursion.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
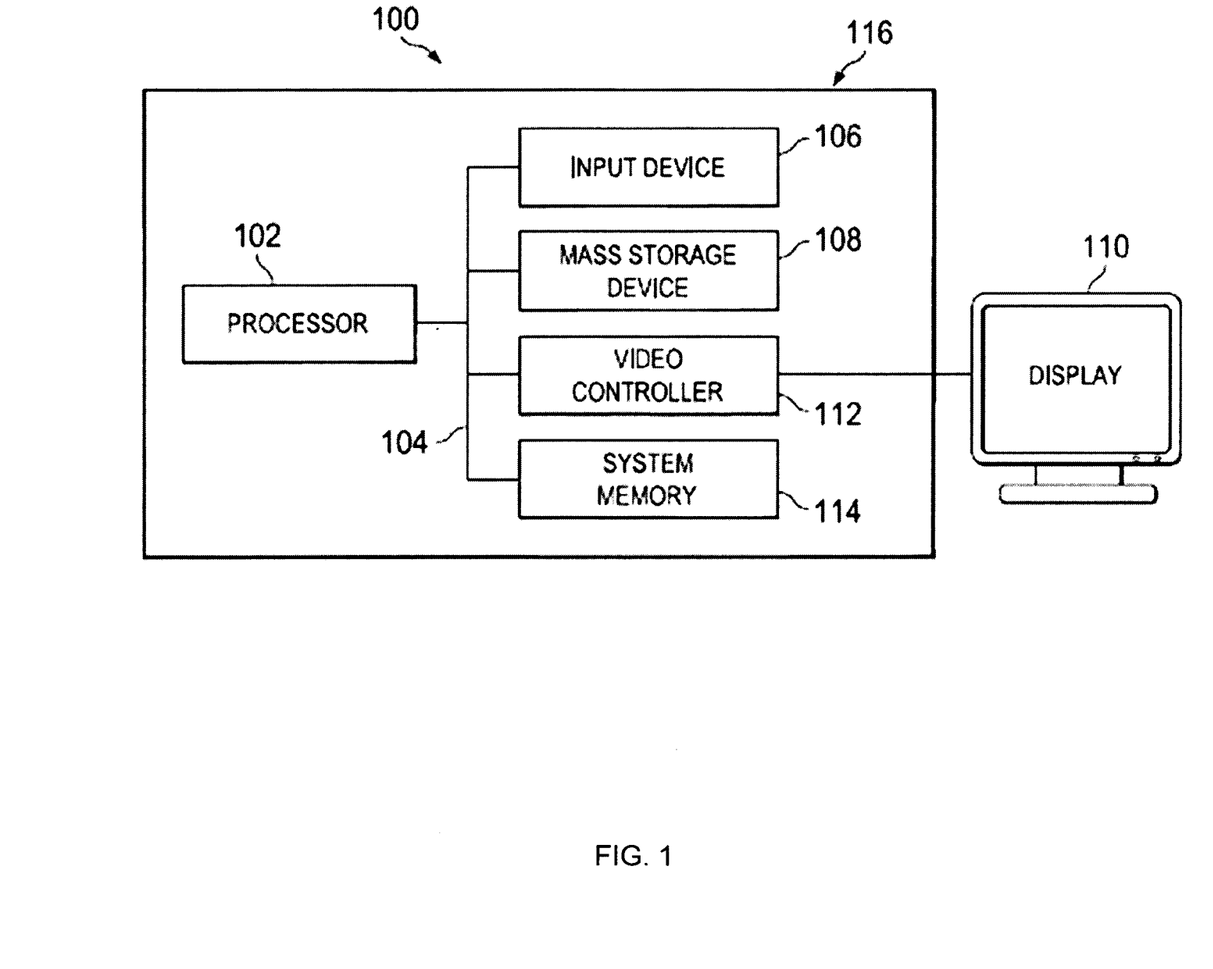
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
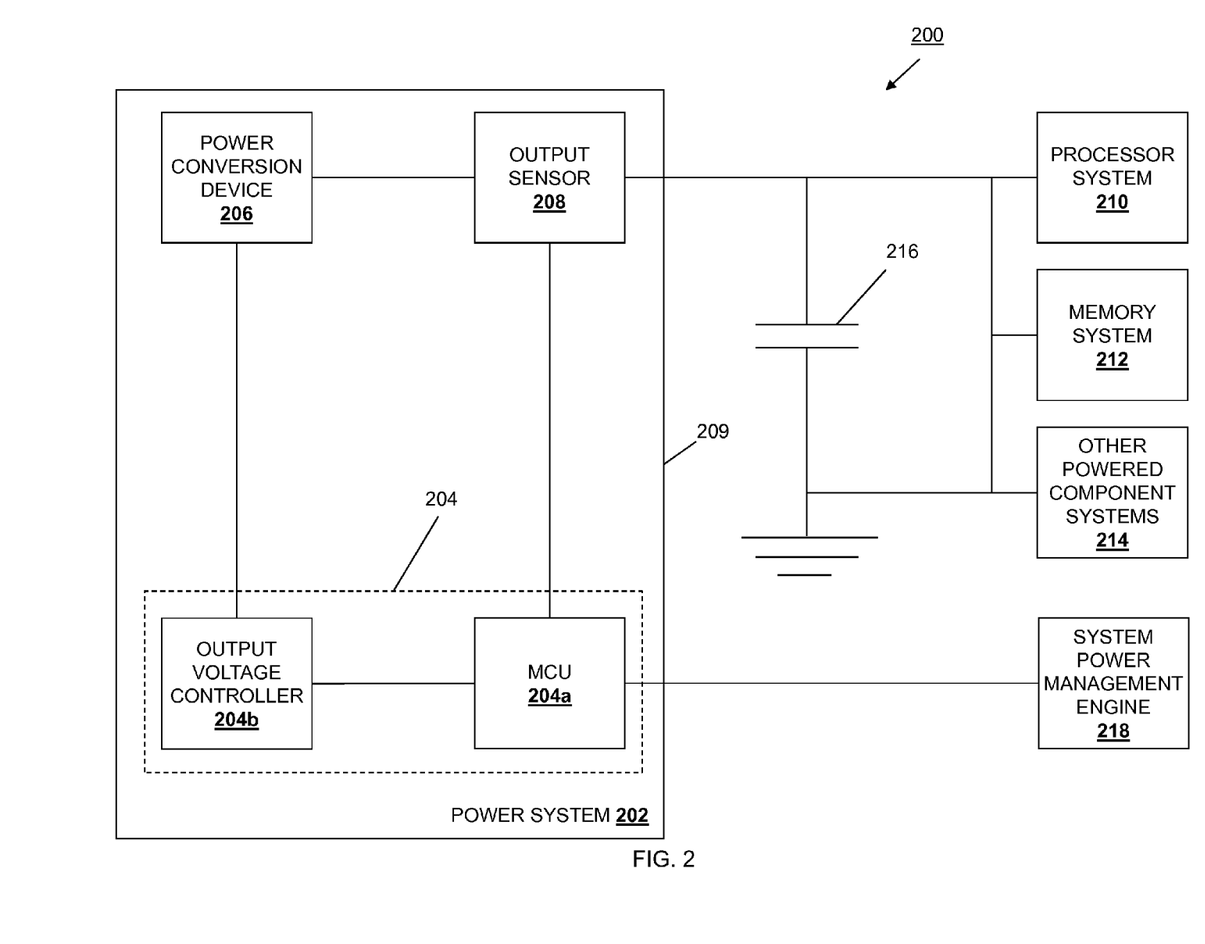
FIG. 2 is a schematic view illustrating an embodiment of a power excursion energy storage system.

Referring now to FIG. 2, an embodiment of a power excursion energy storage system 200 is illustrated. As discussed in further detail below, the IHS power excursion energy storage system 200 may be implemented in or with a variety of IHS's known in the art. For example, the IHS power excursion energy storage system 200 may be implemented as part of the IHS 100, discussed above with reference to FIG. 1, which may include a server IHS, a desktop IHS, a laptop IHS, a tablet IHS, a mobile phone IHS, and/or a variety of similar IHSs known in the art. In another example, the IHS power excursion energy storage system 200 may be implemented as a modular IHS such as, for example, a blade server. As such, in some embodiments, all of the elements in the IHS power excursion energy storage system 200 may be housed in an IHS chassis (e.g., the chassis 116 discussed above with reference to FIG. 1), while in other embodiments, elements of the IHS power excursion energy storage system 200 may be coupled to the IHS (e.g., a plurality of modular IHSs may be coupled to the power system that may include any combination of power supply units (PSUs), power distribution units (PDUs), and/or any a variety of other power system components known in the art, discussed in further detail below.) Thus, a wide variety of modification to the specific embodiments discussed below is envisioned as falling within the scope of the present disclosure, including but not limited to distribution of the components across one or more IHSs.

The power excursion energy storage system 200 includes a power system 202. While one of skill in the art will recognize that the power system 200 discussed below is illustrated and described as a single power supply unit (PSU) providing power to an IHS and its IHS components, any number of PSUs or other power system components may be used to provide power to any number of IHSs having any number of IHS components while remaining within the scope of the present disclosure. The power system 202 includes a power system output controller 204 that, in the illustrated embodiment, includes a master control unit (MCU) 204a coupled to an output voltage controller 204b. However, a variety of different components known in the art may be used to provide the power system output controller 204 discussed below. The power system 202 also includes a power conversion device 206 that is coupled to the output voltage controller 204b in the power system output controller 204. In an embodiment, the power conversion device 206 is operable to receive power from a power source (e.g., an alternating current (AC) or direct current (DC) power source), convert that power (e.g., to a direct current (DC) power), and provide the converted power to the powered system including any number of powered components. An output sensor 208 is coupled to the power conversion device 206 and the MCU 204a in the power system output controller 204. In an embodiment, the output sensor 208 is a current sensor that is operable to determine an output current of the power supply and provide a signal indicative of that output current.

In an embodiment, the power system 200 includes a power system connector 209 that connects the power system to the other components in the power excursion energy storage system 200. The power system connector 209 may include a variety of connectors known in the art for connecting a power system to a powered system. For example, the power system 202 may be separate from the IHS, as discussed above, and the power connector 209 may include a plug, cables, and/or other power system connectors for connecting an external power system to an IHS. In another example, the power system 202 may be integrated with the IHS, discussed above, and the power connector 209 may include wires, solders, and/or other power system connectors for connecting an integrated power system with an IHS.

The power excursion energy storage system 200 also includes a system power management engine 218 that is coupled to the MCU 204a in the power system output controller 204 of the power system 202 (e.g., through the power system connector 209). In an embodiment, the system power management engine 218 may be part of an IHS used in the power excursion energy storage system 200. The power excursion energy storage system 200 also includes a powered system having a plurality of powered component systems that receive power from the power system 202. In the illustrated embodiment, the powered system is an IHS including a plurality of IHS component systems such as a processor system 210, a memory system 212, and other powered component systems 214 (which may be any IHS component systems such as those illustrated in the IHS 100, discussed above with reference to FIG. 1, and/or a variety of other IHS component systems known in the art), each of which is coupled to the power system 202 (e.g., through the power system connector 209) to allow those powered component systems to receive power from the power system 202. A power component system may include one or more components, one or more component voltage regulators (i.e., that convert power for use by the one or more components), and/or a variety of other powered components devices known in the art. For example, the processor system 210 may include one or more processors and one or more processor voltage regulators that convert power received from the power system 202 for use by the one or more processors. Similarly, the memory system 212 may include one or more memory devices and one or more memory device voltage regulators that convert power received from the power system 202 for use by the one or more memory devices. Furthermore, one of skill in the art will recognize that any component system (e.g., a storage device system, an input/output controller system, a cooling system, etc.) may include (or be coupled to) a component and/or a voltage regulator for converting power for use by the component.

In an embodiment, the power excursion energy storage system 200 may include multiple power demand sense points throughout the powered system that operate to provide the power system 202 with accurate data indicative of the the power demand of the powered system and its powered component systems that accounts for losses in the system such as, for example, circuit board distribution losses. For example, power demand sensors may be provided by or with the powered component voltage regulators that provide power to significant system loads such as, for example, the processor voltage regulator discussed above, the memory device voltage regulator discussed above, a storage voltage regulator (e.g., that provides power to a storage drive system), a peripheral component voltage regulator (e.g., that provides power to powered components connected to a Peripheral Component Interconnect express (PCIe) connector), a fan voltage regulator (e.g., that provides power to a fan system), and/or a variety of other point of load (POL) voltage regulators known in the art. Furthermore, a variety of other power demand sense points known in the art may include power demand sensors while remaining within the scope of the present disclosure.

A system capacitance 216 is illustrated as coupled in parallel between the power system 202 and the powered component systems (e.g., the processor system 210, the memory system 212, and the other powered component systems 214) of the powered system. However, the system capacitance 216 included in the power excursion energy storage system 200 illustrated in FIG. 2 is provided to represent one or more energy storage devices in the power excursion energy storage system 200, as discussed in further detail below. In one embodiment, the system capacitance 216 may represent the capacitance included with an IHS motherboard that is coupled to the power supply unit (PSU) power plane in the IHS motherboard. However, in other embodiments, a variety of different and/or additional capacitance sources may be included in the system capacitance 216. For example, the system capacitance 216 may include a power system capacitance that may represent an energy storage capacity of the power system 202, a powered component capacitance that may represent an energy storage capacity of one or more of the powered components (e.g., the one or more processors in the processor system 210, the one or more memory devices in the memory system 212, the one or more powered components in the other powered component systems 214), a powered component voltage regulator capacitance that may represent an energy storage capacity of one or more of the powered component voltage regulators (e.g., the one or more processor voltage regulators in the processor system 210, the one or more memory device voltage regulators in the memory system 212, the one or more powered component voltage regulators in the other powered component systems 214), a board capacitance that may represent an energy storage capacity of one or more circuit boards (e.g., the motherboard coupled to each of the powered components discussed above and/or other circuit boards in the system.)

Figure 3:
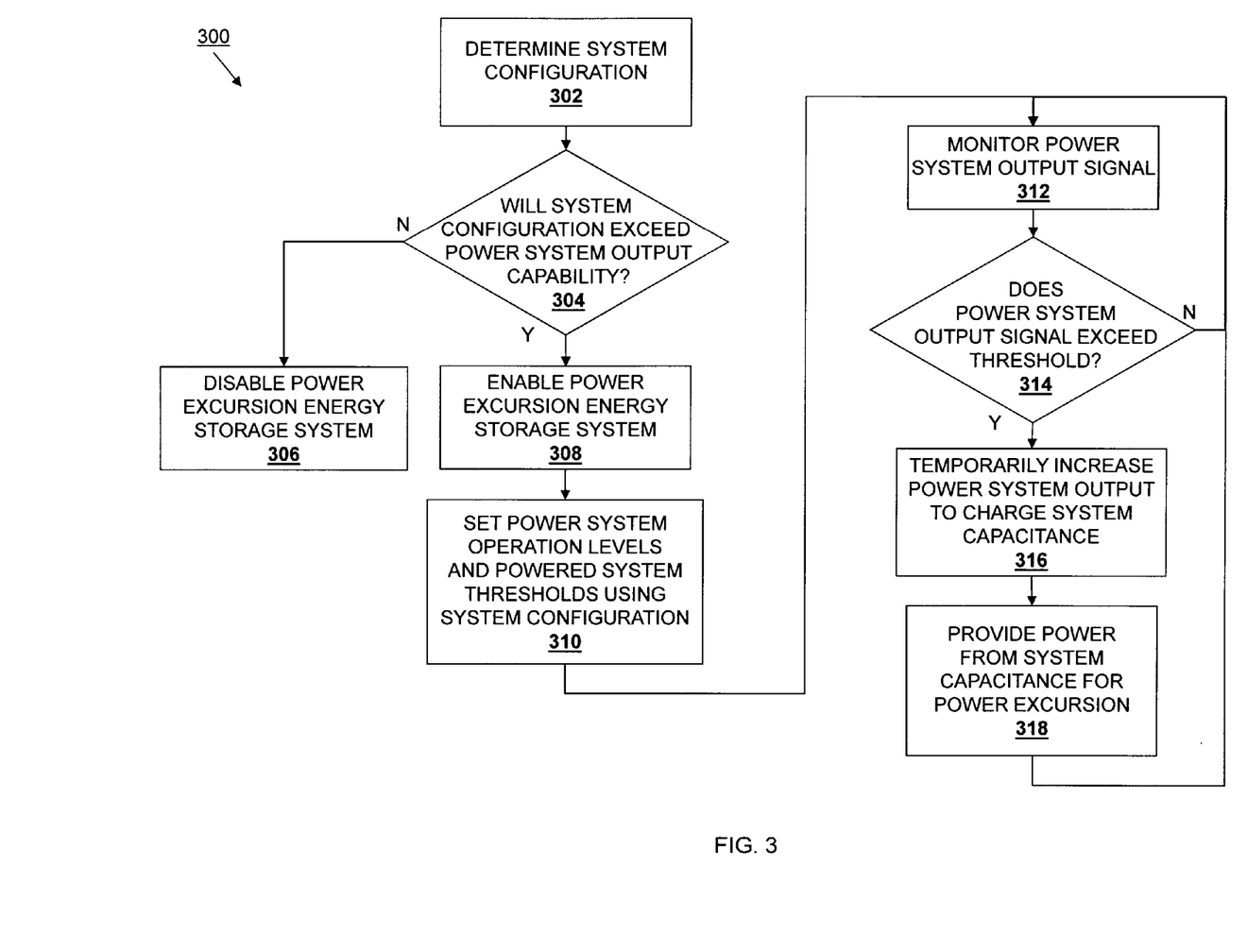
FIG. 3 is a flow chart illustrating an embodiment of a method for dynamically storing energy in an information handling system (IHS) for peak power excursions.
Figure 4:
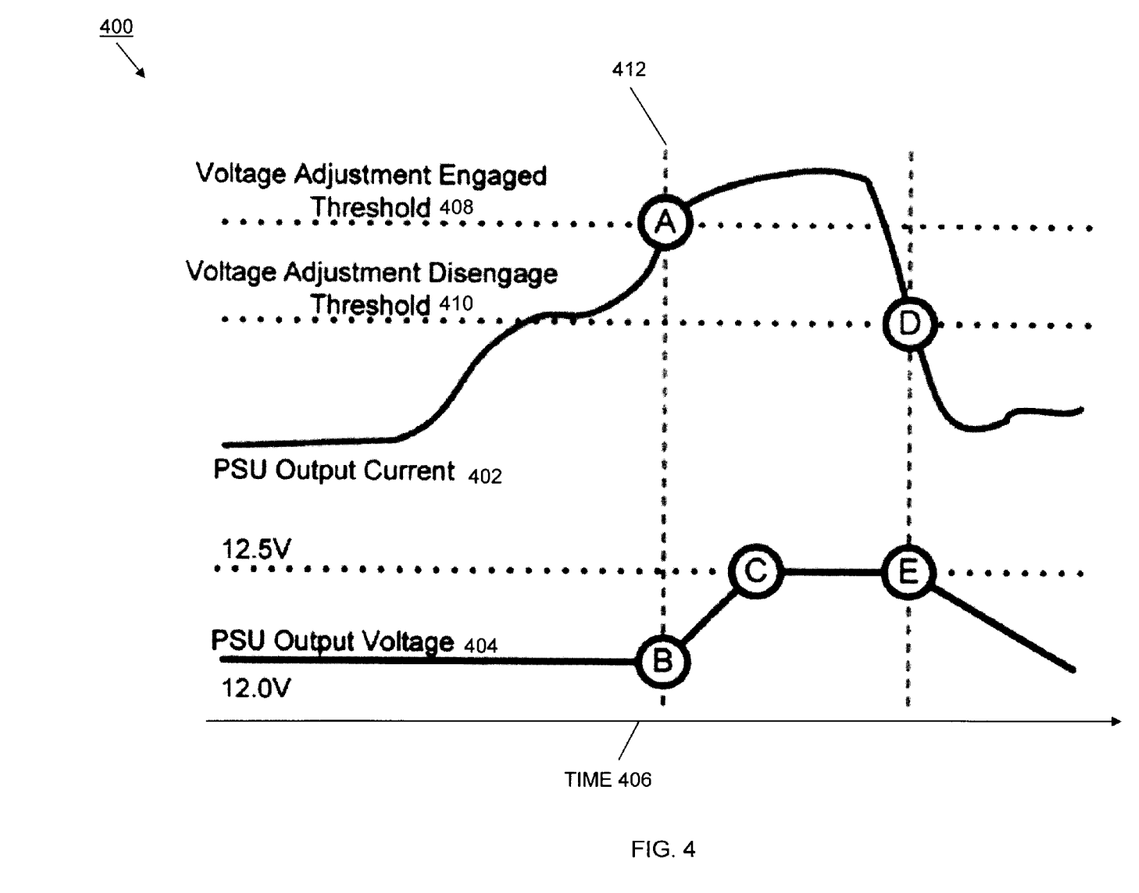
FIG. 4 is a graph illustrating an embodiment of power system operation during the method of FIG. 3.

Referring now to FIGS. 2, 3, and 4, an embodiment of a method 300 for dynamically storing energy for power excursions is illustrated. The method 300 begins at block 302 where a system configuration is determined. In an embodiment, the system power management engine 218 may store or be operable to determine a system configuration that includes the power usage and/or power demand details of the powered system and/or information indicative of the power usage or power demand details of the powered system. The system power management engine 218 may provide that system configuration to the MCU 204a in the power system output controller 204. For example, the system power management engine 218 included in an IHS may be operable to retrieve (e.g., over a power management bus (PMBus), a system management bus (SMBus), etc.) information about the IHS component systems (e.g., one or more processors in the processor system 210, one or more processor voltage regulators in the processor system 210, one or more memory devices in the memory system 212, one or more memory device voltage regulators in the memory system 212, etc.) in an IHS that is indicative of an average power demand of the IHS and/or its IHS component systems, a dynamic power demand of the IHS and/or its IHS component systems, a peak power demand of the IHS and/or its IHS component systems, etc. In one embodiment, the system configuration may include details a power excursion capability of one or more processors in the processor system 210 (e.g., dynamic power excursions, maximum power excursions, etc.), along with IHS workloads that will be run on the IHS and that will dictate if and when the one or more processors will perform a power excursion, the extent of the power excursions that will be performed when the IHS is running the IHS workloads, and/or a variety of other system configuration information known in the art. In another embodiment, the system configuration may also include operating ranges of the powered component systems that indicate a maximum power system output (e.g., an output voltage) of the power system 202 that will still allow safe operation of the powered component systems in the powered system.

The method 300 then proceeds to decision block 304 where it is determined whether the system configuration will result in a power demand that exceeds the power system output capability. In an embodiment, the MCU 204a in the power system output controller 204 is operable to determine the power system output capability of the power system 202. For example, the power system 202 may include protection circuits that shut down the power system 202 or otherwise disable power provided from the power system 202 to the powered system and its powered component systems in response to a power demand on the power system 202 that exceeds a predetermined power demand amount. As discussed above, due to transient power excursions by powered components in the powered system, those protection circuits may activate to disable power from the power system 202 even when the average power provided by the power system 202 is well below the predetermined power demand amount. At block 304, the MCU 204a may retrieve the power system output capability by retrieving the predetermined power demand amount or other information that is indicative of the power output capabilities of the power system 202 in providing power to the powered system and its powered component systems. Then, using the system configuration determined in block 302, the MCU 204a may compare the power demands that will be required according the system configuration and determine whether those power demands will exceed the power system output capability during operation of the powered system.

If, at decision block 304, it is determined that the system configuration will not result in power demands that will exceed the power system output capability of the power system 202, the method 300 proceeds to block 306 where the power excursion energy storage system 200 may be disabled. For example, for some system configurations, the MCU 204a in the power system output controller 204 will determine that those system configurations include powered component systems and workloads that will not result in power excursions that exceed the power system output capability of the power system 202 and, in response, the MCU 204a may disable the functionality discussed below such that the power system 202 will operate as a conventional power system.

If, at decision block 304, it is determined that the system configuration will result in power demands that will exceed the power system output capability of the power system 202, the method 300 proceeds to block 308 where the power excursion energy storage system is enabled. For example, for some system configurations, the MCU 204a in the power system output controller 204 will determine that those system configurations include powered component systems and workloads that will result in power excursions that exceed the power system output capability of the power system 202, and in response, the MCU 204a may enable the functionality discussed below such that the power system 202 will operate as a conventional power system.

The method 300 then proceeds to block 310 where power system operation levels and powered system thresholds are set. In an embodiment, using the system configuration information determined in block 302 of the method 300, the MCU 204a in the power system output controller 204 may set the power system operation levels of the power system 202. For example, as discussed above, the powered component systems (e.g., the processor system 210, the memory system 212, the other powered component systems 214) may include operating ranges that indicate a maximum power system output (e.g., an output voltage) of the power system 202 that will still allow safe operation of the powered component systems. Thus, at block 310, the MCU 204a may set power system operation levels such that the power system 202 will not produce a power system output (e.g., an output voltage) that exceeds the operating ranges of any of the powered component systems in the powered system, ensuring that the increased output voltages for the power system 202 discussed below remain below a maximum level that could cause failure in one or more of the powered component systems in the powered system. In an embodiment, the power system operation levels set at block 310 allow the output voltage of the power system 202 to be safely adjusted, discussed below, to a maximum amount that still provides for all system load reliability requirements.

In an embodiment, using the system configuration information determined in block 302 of the method 300, the MCU 204a in the power system output controller 204 may set powered system thresholds in the power system 202. For example, the MCU 204a may determine from the system configuration that the one or more processors in the processor system 210 include a power excursion capability that results in the one or more processors performing power excursions (e.g., dynamic power excursions and/or peak power excursions) when the IHS is performing its associated workloads according the system configuration, and then determine one or more thresholds that may be used to activate and deactivate the power excursion energy storage system 200 in order to power the IHS during those power excursions as discussed below. In another example, thresholds set at block 310 may be associated with relatively high and low power demand operation of an IHS, with the relatively high power demand operation associated with transient power excursions that causes a total power demand that exceeds the power system output capabilities of the power system 202, and the relatively low power demand operation associated with a total power demand that is within the power system output capabilities of the power system 202. In an embodiment, the thresholds may be determined and provided to the MCU 204a by the system power management engine 218.

FIG. 4 illustrates an embodiment of the operation of the power system 202 with a power system operation graph 400 that plots a Power Supply Unit (PSU) output current 402 and a PSU output voltage 404 vs. time 406. The power system operation graph 400 includes a voltage adjustment engage threshold 408 that may be one of the powered system thresholds set at block 310 of the method 300 as discussed above. In the illustrated embodiment, the voltage adjustment engaged threshold 408 includes a power demand (e.g., a current drawn) by the IHS that causes the power excursion energy storage system 200 to begin to generate energy for storage and use by the powered system and its powered component systems during a power excursion, discussed in further detail below. The power system operation graph 400 also includes a voltage adjustment disengage threshold 410 that may be one of the powered system thresholds set at block 310 of the method 300 as discussed above. In the illustrated embodiment, the voltage adjustment disengage threshold 410 includes a power demand (e.g., a current drawn) by the IHS that causes the power excursion energy storage system to cease generating energy for storage and use by the powered system and its powered component systems during a power excursion, discussed in further detail below. In the illustrated embodiment, the voltage adjustment engaged threshold 408 and the voltage adjustment disengage threshold 410 are separated by a power demand amount (e.g., an amount of current demanded by the IHS) to provide hysteresis and avoid oscillating behavior during power delivery. While a few examples of powered system thresholds have been provided, one of skill in the art will recognize that a variety of thresholds with fall within the scope of the present disclosure to provide the functionality discussed below.

In an embodiment, the blocks 302, 304, 306 or 308, and 310 of the method 300 may be performed in response to the start-up or powering-on of an IHS. For example, some IHS's may include different operating profiles that include different workloads for operation on the IHS, and thus the blocks 302, 304, 306 or 308, and 310 of the method 300 may be performed to enable or disable the power excursion energy storage system 200 depending on whether the operating profile will cause power excursions that will exceed the power system output capability of the power system 202. In another example, an IHS may periodically or occasionally have its powered component systems or other components changed, or have different workload installed, and thus the system configuration of that IHS may periodically or occasionally change. Thus, the blocks 302, 304, 306 or 308, and 310 of the method 300 may be performed regularly or upon periodic/occasional changes to the IHS to determine whether those changes will require the power excursion energy storage system 200 to allow the power system 202 to sufficiently power the powered component systems. In yet another example, the blocks 302, 304, 306 or 308, and 310 of the method 300 may be performed once for an IHS that not expected to have its powered component systems or other components changed, and/or that performs the same workloads regularly, and the blocks 302, 304, and 306 or 308 of the method 300 may either not be performed again, or only may be performed in response to a detected change in the IHS or instruction from a user of the IHS.

The method 300 then proceeds to block 312 where a power system output signal is monitored. In an embodiment, subsequent to the setting of the power system operation levels and powered system thresholds for the power system 202, the powered system and its powered component systems may operate according to the system configuration. For example, in an IHS, the processor system 210, the memory system 212, and the other powered systems 214 may operate to perform workloads for the IHS according to the IHS configuration. During normal operation of the powered system that does not include power excursions by the powered system or powered component systems that exceed a power output capability of the power system 202, the power system 202 provides power according to a default set point voltage. For example, the power system operation graph 400 illustrates how, up to a time 412, the power system 202 provides a PSU output voltage 404 of 12 volts. As can be seen from the power system operation graph 400, with the PSU output voltage 404 at 12 volts, the powered system and its powered component systems may draw a varying current.

During operation of the powered system, the output sensor 208 in the power system 202 is operable to measure a power system output of the power system 202 and provide a signal to the MCU 204a in the power system output controller 204 that is indicative of the power demand of the powered system. For example, the output sensor 208 may be a current sensor that that provides a signal to the MCU 204a that is indicative of the current draw of the IHS including the processor system 210, the memory system 212, and the other system components 214 (e.g., the PSU output current 402 illustrated in the power system operation graph 400 of FIG. 4). In another example, power demand sensors at a plurality of sense points in the IHS may operate to provide the MCU 204a with information indicative of the power demand of the powered component systems as well.

The method 300 then proceed to block 314 where it is determined whether the power system output signal exceeds a threshold. As discussed with reference to block 310, the MCU 204a sets one or more thresholds for the power system 202 that may be used to activate and deactivate the power excursion energy storage system 200. If at decision block 314, the MCU 204a determines that the power system output signal has not exceeded a threshold (e.g., the voltage adjustment engaged threshold 408 illustrated in the power system operation graph 400 of FIG. 4), the method 300 returns to block 312 to monitor the power system output signal.

If at decision block 314, the MCU 204a determines that the power system output signal has exceeded a threshold (e.g., the voltage adjustment engaged threshold 408 illustrated in the power system operation graph 400 of FIG. 4), the method 300 proceeds to block 316 where the power system output is temporarily increased to charge the system capacitance. The power system operation graph 400 illustrates how, at time 412 and point A on the graph 400, the PSU output current 402 increases above the voltage adjustment engaged threshold 408. This increase is accompanied by a power system output signal from the output sensor 208 to the MCU 204a that is indicative of that PSU output current 402, and at decision block 314, the MCU 204a determines that the power system output signal has exceeded the voltage adjustment engaged threshold 408. In response to determining the PSU output current 402 has exceeding the voltage adjustment engaged threshold 408, the MCU 204a sends a signal to the output voltage controller 204b that causes the output voltage controller 204b to control the power conversion device 206 such that the power conversion device 206 increases the power system output of the power system 202 (e.g., by setting an output voltage set point in the power conversion device 206 to a desired voltage).

For example, as can be seen in the power system operation graph 400, prior to time 412, the power system 202 provides a PSU output voltage 404 of 12.0 volts. However, when the PSU output current 402 exceeds the voltage adjustment engaged threshold 408, the output voltage controller 204b controls the power conversion device 206 to increase the PSU output voltage 404 from 12.0 volts at point B on the graph 400 to 12.5 volts at point C on the graph 400. In an embodiment, the output voltage controller 204b may control the power conversion device 206 to increase the power system output at a predefined ramp rate. As can also be seen from the power system operation graph 400, while the PSU output current 402 remains above the voltage adjustment disengage threshold 410, the power conversion device 206 operates such that the PSU output voltage 404 remains at 12.5 volts between points C and E on the graph 400. However, at point D on the graph 400, the PSU output voltage 402 falls below the voltage adjustment disengage threshold 410. This decrease is accompanied by a power system output signal from the output sensor 208 to the MCU 204a that is indicative of that PSU output current 402 and results in the MCU 204a determining that the power system output signal has decreased below the voltage adjustment disengage threshold 410. In response to determining that the PSU output current 402 has decreased below the voltage adjustment disengage threshold 410, the MCU 204a sends a signal to the output voltage controller 204b that causes the output voltage controller 204b to control the power conversion device 206 such that the power conversion device 206 decreases the power system output. Thus, at point E on the graph 400, the PSU output voltage 404 is allowed to decay back to 12.0 volts.

Thus, when the powered system and its powered component systems operate such that a power system output signal indicates that a threshold is being exceeded, the power system output is temporarily increased (i.e., for as long as the powered system and its powered component systems are operating such that they may produce a power demand that exceeds the power output capability of the power system 202). This increase in power system output is used to charge the system capacitance 216 at block 316 of the method 300. The system capacitance stored charge relationship with the power system output voltage is governed by the equation:

$$U = \tfrac{1}{2}CV^2$$

where C is the value of the system capacitance (e.g., in Farads) and V is the power system output (e.g., in Volts.) With the squared relationship between power system output and the system capacitance stored charge, the calculation below gives the following system capacitance stored charge for operation of the power system 202 at 12 volts with a system capacitance of 20 μFarads:

$$U_1 = \tfrac{1}{2}(20 \times 10^{-6} \text{ farads})(12 \text{ volts})^2 = 0.0014 \text{ coulombs}$$

The calculation below illustrates the increase in system capacitance stored charge for operation of the power system 202 at 13 volts with a system capacitance of 20 μFarads:

$$U_2 = \tfrac{1}{2}(20 \times 10^{-6} \text{ farads})(13 \text{ volts})^2 = 0.0017 \text{ coulombs}$$

Thus, as can be seen, a 1 volt increase in the power system output yields an approximately 20% increase in the system capacitance stored charge. One of skill in the art will recognize that the system capacitance and power system output may be sized and/or modified for a particular system configuration in order to allow the system to store an amount of charge in the system capacitance that is sufficient to power that system configuration through a predetermined maximum power demand expected as a result of power excursions (e.g., dynamic and/or peak power excursions.)

The method 300 then proceeds to block 318 where power is provided from the system capacitance for a power excursion by the powered system and/or one or more of its powered component systems. As discussed above with regard to block 316, the power system 202 operates to generate a stored charge in the system capacitance 216 when the powered system and/or powered component system operation exceeds a threshold. As also discussed above, that threshold may be associated with a power excursion by the powered system and, more particularly, by one or more of the powered component systems in the powered system. Thus, as those one or more of the powered component systems begins or approaches a power excursion, the power system 202 operates to provide additional stored charge in the system capacitance 216 for use by the powered system and its powered component systems. Thus, when a powered component system performs the power excursion such that the power demand from the powered system and its powered component system would otherwise cause the power system 202 to exceed its power system output capability, the power system 202 instead provides a power system output to the powered system and its powered component systems that is at or below its power system output capability, and the powered system and its powered component systems are powered with additional power up to the power excursion amount demanded using the stored charge in the system capacitance 216.

In one example, a processor in the processor system 210 includes a power excursion capability that includes temporary dynamic power excursions and peak power excursions that provide a total power demand on the power system 202 that exceeds the power system output capability. The power system 202 is operable to determine that the power excursions by the processor will occur and, in response, increase the power system output voltage to generate an additional stored charge in the system capacitance 216. When the processor performs the power excursion, the power used to power the processor is provided by the power system 220, operating within its power system output capability, and the stored charge in the system capacitance 216. When the power demand on the power system 202 then drops below a threshold, the power system 202 decreases its power system output voltage back to the original level. Thus, the power excursion energy storage system 200 is operable to repeatedly increase the power system output of the power system 202 to provide the additional stored charge in the system capacitance 216 for use by the processor during dynamic and/or peak power excursions, and then decrease the power system output of the power system 202 when those dynamic and/or peak power excursions are no longer present or no longer would result in the power system 202 operating beyond its power system output capability.

Thus, a system and method have been described that allow a power system to be appropriately sized for the average power requirements of an information handling system. When the information handling system performs power excursions that may be well above the average power requirements for a temporary but significant amount of time, the power system operates to generate a charge in the system capacitance that is then used, along with a power system output of the power system that is at or below its maximum power system output capability, to power the information handling system through the power excursion. Such systems and methods allow the provision of a smaller and more efficient power system that is appropriate for a majority of the operation conditions that will be experienced by the information handling system, while allowing the information handling system to be supplied sufficient power during transient, high power demand situations such that no performance degradation exists due to the use of the smaller and more efficient power system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power system, comprising:
a power system connector that is configured to couple to a powered system and a system capacitance that is coupled between the power system connector and the powered system;
a power system output sensor coupled to the power system connector;
a power conversion device coupled to the power system connector and configured to provide a power system output to the system capacitance and the powered system; and
a power system output controller coupled to the power conversion device and the power system output sensor, wherein the power system output controller includes a powered system threshold that is related to a power excursion capability of the powered system, and wherein the power system output controller is configured to control the power conversion device to provide a first power system output level to the system capacitance and the powered system and, in response to subsequently receiving a power system output signal from the power system output sensor that exceeds the powered system threshold, to control the power conversion device to increase the first power system output level from the power conversion device to a second power system output level in order to increase the energy stored in the system capacitance for use by the powered system during a power excursion.

2. The power system of claim 1, wherein the power system connector is configured to couple to a system power management engine, and wherein the system power management engine is configured to provide the powered system threshold that is related to the power excursion capability of the powered system to the power system output controller.

3. The power system of claim 1, wherein the power system output controller includes a first powered system threshold and a second powered system threshold that is lower than the first powered system threshold, and wherein the power system output controller is configured to control the power conversion device to increase the first power system output level to the second power system output level in response to the power system output signal exceeding the first powered system threshold, and wherein the power system output controller is configured to control the power conversion device to decrease the second power system output level to the first system output level if in response to the power system output signal decreasing below the second powered system threshold.

4. The power system of claim 1, wherein the power system output sensor includes a power system output current sensor and the power system output signal is indicative of the current drawn by the powered system.

5. The power system of claim 4, wherein the power system output is a power system output voltage.

6. The power system of claim 1, wherein the powered system threshold is related to a configuration of powered components in the powered system.

7. The power system of claim 1, wherein the system capacitance includes a power system capacitance of the power system, a powered component capacitance of powered components in the powered system, a powered component voltage regulator capacitance of powered component voltage regulators in the powered system, and a board capacitance of the powered system.

8. An information handling system (IHS), comprising:
a circuit board;
a processor that is mounted to the circuit board;
a system capacitance coupled to the processor and that is provided, at least in part, by the circuit board; and
a power system coupled to the processor and the system capacitance, wherein the system capacitance is coupled between the power system and the processor, and wherein the power system includes:
a power system output sensor coupled to the processor;
a power conversion device that is configured to provide a power system output to the system capacitance and the processor; and
a power system output controller coupled to the power conversion device and the power system output sensor, wherein the power system output controller includes a IHS power threshold that is related to a power excursion capability of the processor, and wherein the power system output controller is configured to control the power conversion device to provide a first power system output level to the system capacitance and processor and, in response to subsequently receiving a power system output signal from the power system output sensor that exceeds the IHS power threshold, to control the power conversion device to increase the first power system output level from the power conversion device to a second power system output level in order to increase the energy stored in the system capacitance for use by the processor during a power excursion.

9. The IHS of claim 8, further comprising:
an IHS power management engine that is configured to provide the IHS power threshold that is related to the power excursion capability of the processor to the power system output controller.

10. The IHS of claim 8, wherein the power system output controller includes a first IHS power threshold and a second IHS power threshold that is lower than the first IHS power threshold, and wherein the power system output controller is configured to control the power conversion device to increase the first power system output level the a second power system output level in response to the power system output signal exceeding the first IHS power threshold, and wherein the power system output controller is configured to control the power conversion device to decrease the second power system output level to the first power system output level in response to the power system output signal decreasing below the second IHS power threshold.

11. The IHS of claim 8, wherein the power system output sensor includes a power system output current sensor and the power system output signal is indicative of the current drawn by the IHS.

12. The IHS of claim 11, wherein the power system output is a power system output voltage.

13. The IHS of claim 8, wherein the IHS power threshold is related to a configuration of IHS components in the IHS.

14. The IHS of claim 8, wherein the system capacitance includes a power system capacitance of the power system, an IHS component capacitance of IHS components in the IHS, a voltage regulator capacitance of voltage regulators in the IHS, and aboard capacitance of a circuit board in the IHS.

15. A method for dynamically storing energy in an information handling system (IHS) for power excursions, comprising:
monitoring a power system output signal that is indicative of a power system output that is provided baa power supply unit(PSU)to an IHS ;
providing a first power system output level from the PSU to the IHS:
determining that the power system output signal exceeds an IHS power threshold that is related to a power excursion capability of the IHS; and
causing the PSU to increase the first power system output level to a second Power system output level in response to determining that the power system output signal exceeds the IHS power threshold, wherein the second power system output level increases the energy stored in a system capacitance that is housed in the IHS for use by at least one component in the HIS during a power excursion.

16. The method of claim 15, further comprising:
receiving the IHS power threshold that is related to the power excursion capability of the IHS from the IHS.

17. The method of claim 15, wherein the power system output is increased from a first power system output level to a second power system output level in response to the power system output signal exceeding a first IHS power threshold and the method further comprises:
causing the PSU to decrease the second power system output level to the first power system output level in response to the power system output signal decreasing below a second IHS power threshold that is lower than the first IHS power threshold.

18. The method of claim 15, wherein the power system output signal is indicative of the current drawn by the IHS.

19. The method of claim 18, wherein the power system output is a power system output voltage.

20. The method of claim 15, wherein the IHS power threshold is related to a configuration of IHS components in the IHS.

* * * * *